No. 752,429. PATENTED FEB. 16, 1904.
F. L. O. WADSWORTH.
PRISMATIC ILLUMINATING STRUCTURE.
APPLICATION FILED OCT. 28, 1898.
NO MODEL.

WITNESSES
Warren W. Swartz
H. M. Comin

INVENTOR
Frank L. O. Wadsworth
by Bakewell & Bakewell
his attorneys

No. 752,429. Patented February 16, 1904.

UNITED STATES PATENT OFFICE.

FRANK L. O. WADSWORTH, OF WILLIAMS BAY, WISCONSIN, ASSIGNOR, BY MESNE ASSIGNMENTS, TO PRESSED PRISM PLATE GLASS COMPANY, A CORPORATION OF WEST VIRGINIA.

PRISMATIC ILLUMINATING STRUCTURE.

SPECIFICATION forming part of Letters Patent No. 752,429, dated February 16, 1904.

Application filed October 28, 1898. Serial No. 694,819. (No model.)

*To all whom it may concern:*

Be it known that I, FRANK L. O. WADSWORTH, of Williams Bay, in the county of Walworth and State of Wisconsin, have invented a new and useful Improvement in Prismatic Illuminating Structures, of which the following is a full, clear, and exact description, reference being had to the accompanying drawings, forming part of this specification, in which—

Figure 1:
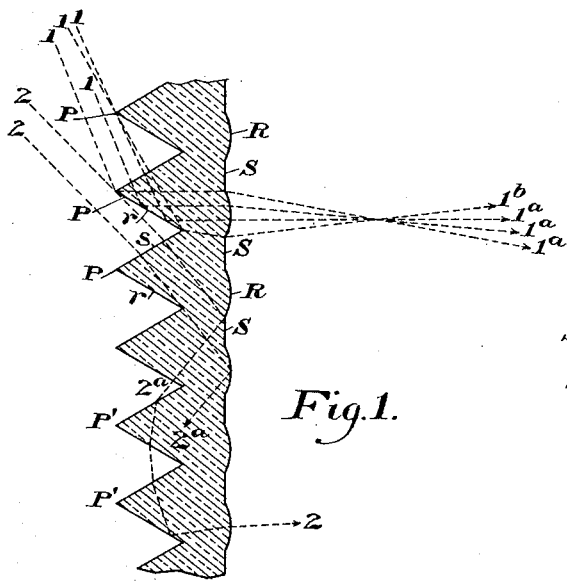
Figure 2:
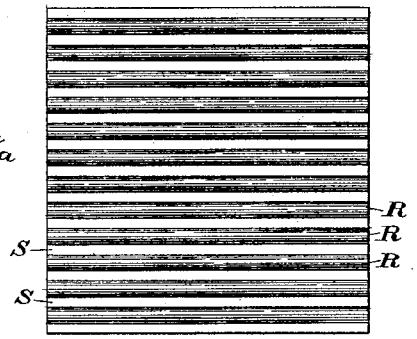
Figure 3:
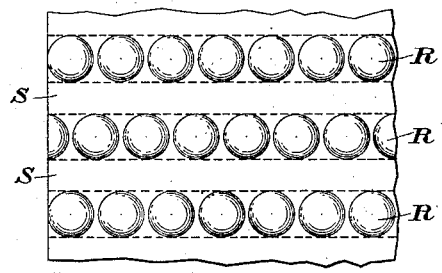
Figure 6:
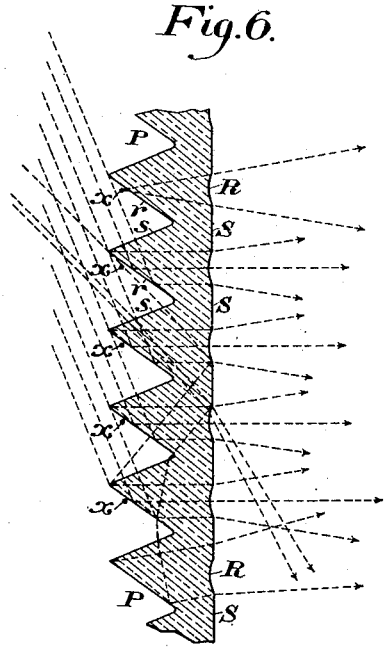
Figure 4:
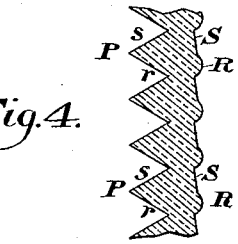
Figure 5:
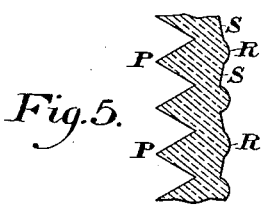

Figure 1 shows my improved illuminating structure and the direction of the rays of light falling upon and passing through the same. Fig. 2 is a rear view thereof. Fig. 3 shows a modified form in which the dispersing portions on the rear side are lenticular. Figs. 4 and 5 represent illuminating structures in which the rear surface is provided with unsymmetrical ribs and intervening spaces. Fig. 6 shows a modified construction of the dispersing portions of the rear surface.

My invention relates to illuminating structures; and the object is to secure an improved form of structure of the kind ordinarily known as "prismatic," whereby the rays of light available for producing an increased illuminating effect are more efficiently utilized and distributed within the space to be illuminated.

Where the source of illumination is an extended sky area, such as the opening above a wide street, it is generally unnecessary to provide any means for diffusing or scattering the light which is deflected by the illuminating structure, as the light from different portions of the illuminating area passes through the structure in different directions and produces all of such effect as is desired; but where the light comes from a very limited source of illumination, as from the opening in a narrow alley or light-well, all of the principal rays of light falling on the illuminating structure come from practically the same direction, the light being cut off on one side by the top of the opposite building and on the other by the window cornice or sash. In the case of an ordinary structure the rays of light falling on the structure are deflected and emerge from the structure in a series of bundles, and the result is that when such structures are viewed from the inside they present a series of bright and dark bands, or, in other words, the illumination in the interior of the space is not uniform, but is broken up, as if the light came through a series of narrow slits.

To avoid the difficulties incident to prior constructions, I make the rear surface of the prismatic plate of the form shown in Fig. 1 in cross-section and in elevation in Fig. 2— that is, with the series of curved ribs R R R each opposite a deflecting side $r$ of the prismatic elements P of the structure, separated by a series of flat surfaces S S opposite the incident sides $s\ s$ of the said elements. The curved ribs R R being opposite the deflecting portions of the prism elements receive the bundles of rays deflected therefrom centrally, and therefore disperse them symmetrically along the general line $1^a$, in which an increased illuminating effect is desired. Further, the flat portions S S between these ribs are so situated with respect to the prismatic elements P P that the rays of light from the direction 2 2 falling directly on the rear surface of the plate are in large part reflected by these flat portions in such a direction $2^a$ as to fall again upon the prismatic elements P' P' lower down in the structure and be refracted and deflected thereby in such direction as to finally emerge from the inner surface of the structure in a direction nearly parallel to that in which an increased illuminating effect is desired, as $2^b$.

In certain cases I further secure a better dispersion and scattering of the light in a horizontal direction by making the curved dispersing portions on the rear side of the plate lenticular, as in Fig. 3, instead of cylindrical, as in Fig. 2. In this case the bundle of rays falling upon each of the said lenticular parts is scattered horizontally, as well as vertically. The question as to whether the lenticular or cylindrical parts shall be employed depends in general upon whether the source of illumination extends to a considerable direction on each side of the window-opening, as in the case of alleys, or is confined in both directions, as in the case of cylindrical or square light-wells.

The curved dispersing parts may be of either circular, elliptical, hyperbolic, or of other cross-section.

The dispersing portions may be either projecting cones or ribs, as in Figs. 1, 2, 3, 4, and 5, or may be shallow recesses or grooves, as shown in Fig. 6. In all these cases the action aimed at and desired is simply to disperse or spread the bundle of rays falling upon these portions without any substantial change in general direction. I have called such surface, therefore, by the general term "dispersing-surfaces." When the surfaces are convex or curved outwardly with respect to the incident beam of light, the rays are first converged to points behind the structure, from which they diverge or are dispersed. When the surfaces are concave or curved inwardly, the divergence takes place at once, the dispersion-points being in this case vertical and retreated in front of the dispersing-surface, as at $x\ x\ x$, Fig. 6. The intermediate flat portions preferably lie all in or parallel to one plane, but may in certain cases be slightly inclined to each other, as in Figs. 4 and 5.

Without limiting myself to the precise details shown, I claim—

1. An illuminating prism structure having prism surfaces on the light-receiving side, and a series of symmetrically-arranged curved surfaces with an equal number of intermediate plane surfaces on the light-discharging side; substantially as described.

2. An illuminating prism structure having prism surfaces on the light-receiving side, and a series of curved surfaces with an equal number of intermediate plane surfaces on the light-discharging side; substantially as described.

3. An illuminating structure having on one side a series of prisms, and on the other an equal number of series of curved dispersing-surfaces arranged symmetrically opposite one side of the prism element, intermediate a series of flat surfaces opposite the other sides of the prism elements; substantially as described.

4. An illuminating structure having on one side a series of prisms and on the other a discharging-face consisting of an equal number of series of symmetrically-arranged curved dispersing-surfaces separated by a series of plane surfaces substantially parallel to the general plane of the structure; substantially as described.

5. An illuminating structure having on one side a series of prisms and on the other a discharging-surface made up of an equal number of series of curved dispersing-surfaces symmetrically arranged opposite the deflecting sides $r, r$ of the prism elements and acting to diffuse the rays deflected by the latter, and a second set of intermediate plane surfaces substantially parallel to the general plane of the structure and acting to reflect the rays deflected by the receiving sides $s, s$ of the prism elements; substantially as described.

6. An illuminating structure having on the receiving side a series of prisms, and on the discharging side a series of flat surfaces substantially parallel to the general plane of the structure, intermediate a symmetrically-arranged series of curved dispersing-surfaces depressed below the general surface of the plate; substantially as described.

In testimony whereof I have hereunto set my hand October 8, 1898.

FRANK L. O. WADSWORTH.

Witnesses:
THOMAS W. BAKEWELL,
GEORGE B. BLEMMING.